United States Patent [19]

Mittelhäuser

[11] Patent Number: 4,877,319
[45] Date of Patent: Oct. 31, 1989

[54] EXTERNAL MIRROR FOR A VEHICLE

[76] Inventor: Bernhard Mittelhäuser, Am Krähenberg, D-3002 Wedemark 2, Fed. Rep. of Germany

[21] Appl. No.: 185,165

[22] Filed: Apr. 22, 1988

[30] Foreign Application Priority Data

Apr. 23, 1987 [DE] Fed. Rep. of Germany ....... 3713579

[51] Int. Cl.$^4$ ................................................ G02B 5/08
[52] U.S. Cl. .................................... 350/604; 350/632; 248/549
[58] Field of Search ....................... 350/604, 631, 632; 248/900, 549, 476, 479, 486

[56] References Cited

U.S. PATENT DOCUMENTS

| 3,828,623 | 8/1974 | Zillner | 248/900 |
| 4,626,084 | 12/1986 | Kumai | 350/637 |
| 4,776,231 | 10/1988 | Cummins et al. | 248/476 |

FOREIGN PATENT DOCUMENTS

85/03043 7/1985 PCT Int'l Appl. ................. 350/637

Primary Examiner—Bruce Y. Arnold
Assistant Examiner—Jay Ryan
Attorney, Agent, or Firm—Becker & Becker

[57] ABSTRACT

An external mirror for a vehicle, including a base that is secured to the vehicle and a housing that is mounted on the base in such a way as to be pivotable about an approximately vertical axis. The housing accommodates a mirror body that is adjustable via an electric motor, with adjustment members being provided between the motor and the mirror body. To avoid vibrations of the housing, the motor is mounted in the base. Coupling elements can be provided that disengage when the housing is swung out, and that engage when the housing is swung in.

8 Claims, 1 Drawing Sheet

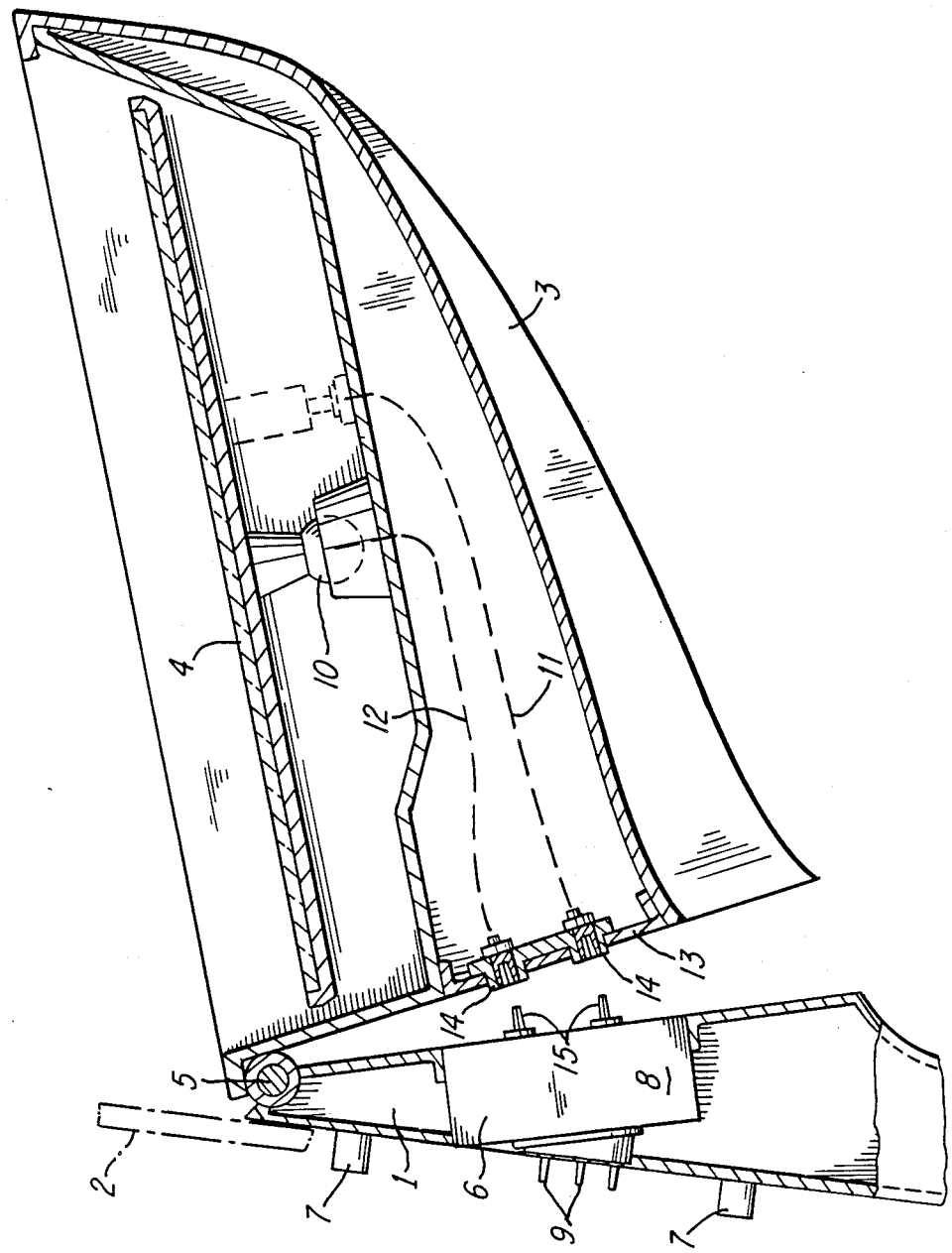

EXTERNAL MIRROR FOR A VEHICLE

BACKGROUND OF THE INVENTION

The present invention relates to an external mirror, such as a rear view or side view mirror, for a motor vehicle. The mirror includes a base that is to be secured to the vehicle, and a housing that is mounted on the base in such a way as to be pivotable about an approximately vertical axis, with the housing accommodating a mirror body that is adjustable via an electric motor. Adjustment members are disposed between the electric motor and the mirror body.

With the heretofore known mirrors of this general type, the electric motor is disposed behind the mirror body within the aforementioned housing. Under these conditions, vibrations that occur while the vehicle is in motion cannot be avoided. These vibrations lead to corresponding, undesired shifting of the mirror, and hence to impairment of visibility.

It is therefore an object of the present invention to improve an external mirror of the aforementioned general type in such a way that the mirror body, which is disposed in a housing that can be pivoted, is to a large extent protected from vibrations.

BRIEF DESCRIPTION OF THE DRAWING

This object, and other objects and advantages of the present invention, will appear more clearly from the following specification in conjunction with the accompanying schematic drawing, which is a partially cross-sectioned plan view of one exemplary embodiment of the inventive external mirror for a passenger car, with the mirror being swung out.

SUMMARY OF THE INVENTION

The external mirror of the present invention is characterized primarily in that the electric motor is disposed in the base of the mirror. Thus, the only parts disposed in that part of the mirror that can be pivoted are the mirror body and its adjustment members, while the heavier electric motor is mounted within the base. This inventive proposal also offers the possibility for disposing the electrical connections for the motor on the latter in such a way that an electrical connection to the power supply is already effected when the mirror is installed, in other words, is already provided when the base of the mirror is secured to the vehicle. In a manner similar to that of other electrical devices, this electrical connection can be effected in a simple manner via a plug connection.

The connection between the electric motor and the adjustment members for adjusting the mirror body about its vertical and horizontal axes is expediently realized by flexible shafts. Automatic plug connections could also be provided in the region where the mirror housing and the base are separated from one another. These latter connections are to be disconnected when the housing is pivoted or swung away, and are again to be established when the mirror body, together with its shell-shaped housing, are again pivoted or swung back into the operative position.

Further specific features of the present invention will be described in detail subsequently.

DESCRIPTION OF PREFERRED EMBODIMENTS

Referring now to the drawing in detail, the external mirror has two main components, namely a stationary base 1 that has an approximately triangular cross section and serves for the securement of the mirror to the vehicle, the outer surface of which is indicated by the reference numeral 2, and an approximately shell-shaped housing 3 for receiving a mirror body 4.

In a known manner, the housing 3 is open in a direction counter to the direction of forward travel of the vehicle. Furthermore, relative to this forward direction of travel, the rear edge of the housing 3 is hingedly connected to the base 1 via a pivot shaft 5 that is disposed approximately vertically. This pivotable mounting of the mirror is predominantly provided for safety reasons. It is to be understood that this hinged connection and the means for mounting the housing in an operative position have certain tolerance, for which reason the danger of vibrations exists. However, such vibrations can also result from the fact that the housing 3 is disposed at a suitable distance from the outer surface 2 of the vehicle, hence resulting in a not inconsiderable lever arm.

In order to be able to counter the problems connected with the aforementioned arrangement and resulting vibrations, the drive mechanism for the mirror body 4 is inventively provided within the base 1. Thus, the electric motor 6 is mounted within the base 1, and hence is relatively rigidly connected to the vehicle. This is achieved by the mounting elements 7 on the base 1, so that it is possible to securely fasten the base 1, and hence the electric motor 6, to the vehicle.

It is also important that the electrical connectors 9 be disposed directly on the housing 8 of the electric motor 6 to thus enable an easy mounting of the mirror. When the base 1 is placed on and secured to the vehicle, an electrical connection to the power supply is simultaneously and automatically effected.

Within the housing 3, the mirror body 4, can be adjusted in all directions by a ball-and-socket joint 10. In addition, two adjustment members 11, 12 act upon the mirror body 4. One of these adjustment members, the member 11, serves to adjust the mirror about the vertical axis, while the other adjustment member 12 serves to adjust the mirror about the horizontal axis.

The adjustment members 11, 12 are preferably flexible shafts that bring about an adjustment via a rotational movement, whereby in a customary manner the actual adjustment can then occur via a threaded engagement. On the inside surface 13 of the housing 3, i.e. on that surface of the housing that faces the base 1, the adjustment members 11, 12 are provided with fixed connections 14, in the form of connector elements, that cooperate with corresponding connector elements 15 on the base 1. The connector elements 14 and 15 are operatively connected with one another when the housing 3 is tilted or pivoted into the operative position. Similarly, this connection is automatically interrupted when, in the case of danger, the housing 3 is pivoted or swung away (this is the position illustrated in the drawing). Thus, it can be seen that the connector elements 14, 15 form a plug-type coupling.

The connector elements 15, just like the electrical connectors 9, are preferably disposed directly on the housing 8 of the electric motor 6, so that here also a simplification for the mounting is provided and on the whole the mechanism is better protected from problems.

The adjustment members 11, 12, which are embodied as flexible shafts, can also be embodied as Bowden control cables that have a direct influence upon the adjustment of the mirror body 4, i.e. result in an immediate shifting and adjustment of the mirror body.

The present invention is, of course, in no way restricted to the specific disclosure of the specification and drawing, but also encompasses any modifications within the scope of the appended claims.

What I claim is:

1. An external mirror for a motor vehicle, including a base that is to be secured to said vehicle, and a housing that is mounted on said base in such a way as to be pivotable about an approximately vertical axis, with said housing accommodating an adjustable mirror body; said mirror further comprising:
    adjustment members connected to said mirror body to effect adjustment thereof; and
    an electric motor that is mounted in said mirror base and is connectable to said adjustment members for operating same;
    wherein said adjustment members are disposed in said housing include first connector elements connected to said adjustment members, and second connector elements connected electric motor, with said first and second connector elements being automatically disengaged from one another when said housing is pivoted away from said base, and with said first and second connector elements automatically engaging one another, to effect said connection between said electric motor and said adjustment members, when said housing is pivoted all the way in.

2. A mirror according to claim 1, in which said adjustment members include flexible shafts.

3. A mirror according to claim 1, in which said adjustment members include flexible control cables.

4. A mirror according to claim 1, in which said electric motor is disposed in a housing, and said second connector elements are disposed on said motor housing.

5. A mirror according to claim 4, which includes electrical connectors that are disposed on said motor housing and provide for electrical connection of said electric motor to a power supply.

6. A mirror according to claim 5, in which said electrical connectors form part of a plug-type connection.

7. A mirror according to claim 5, in which said electric motor and its housing have a configuration that is adapted to the shape of said mirror base.

8. A mirror according to claim 1, in which said first and second connector elements form a plug-type coupling.

* * * * *